(12) United States Patent
Sato (10) Patent No.: US 10,201,901 B2
(45) Date of Patent: Feb. 12, 2019

(54) ROBOT APPARATUS, METHOD FOR CONTROLLING ROBOT, PROGRAM, AND RECORDING MEDIUM

(71) Applicant: CANON KABUSHIKI KAISHA, Tokyo (JP)

(72) Inventor: Shuuichi Sato, Kawasaki-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 15/002,831

(22) Filed: Jan. 21, 2016

(65) Prior Publication Data

US 2016/0221193 A1 Aug. 4, 2016

(30) Foreign Application Priority Data

Jan. 29, 2015 (JP) ................... 2015-015604
Dec. 22, 2015 (JP) ................... 2015-249285

(51) Int. Cl.
*B25J 9/00* (2006.01)
*B25J 9/16* (2006.01)
*B25J 13/08* (2006.01)

(52) U.S. Cl.
CPC .......... *B25J 9/1694* (2013.01); *B25J 9/1674* (2013.01); *B25J 13/085* (2013.01); *B25J 9/1676* (2013.01); *G05B 2219/39529* (2013.01); *G05B 2219/40599* (2013.01); *G05B 2219/40607* (2013.01); *Y10S 901/04* (2013.01); *Y10S 901/09* (2013.01)

(58) Field of Classification Search
USPC ................................................ 700/245–264
See application file for complete search history.

(56) References Cited

U.S. PATENT DOCUMENTS

| 3,543,910 | A | * | 12/1970 | Martin | B25J 5/04 198/341.08 |
| 4,453,085 | A | * | 6/1984 | Pryor | B25J 18/002 250/203.1 |
| 5,021,728 | A | * | 6/1991 | Sato | G05F 1/62 323/272 |
| 5,162,721 | A | * | 11/1992 | Sato | G05F 1/577 320/106 |
| 5,227,930 | A | * | 7/1993 | Thanos | G11B 5/59677 360/77.03 |
| 5,535,306 | A | * | 7/1996 | Stevens | B25J 9/1692 700/254 |
| 5,767,648 | A | * | 6/1998 | Morel | B25J 9/1628 318/568.1 |

(Continued)

FOREIGN PATENT DOCUMENTS

| JP | H02-139190 A | 5/1990 |
| JP | 2009-075083 A | 4/2009 |

*Primary Examiner* — Jonathan L Sample
(74) *Attorney, Agent, or Firm* — Venable, LLP (57) ABSTRACT

An object of the present invention is to sense forces from a fine external force to a large external force with high precision, and enable high-precision control. A multi-joint robot arm has a first sensor arranged in an end portion, and second sensors arranged in joints, respectively. The first sensor and the second sensor have different detectable ranges from each other for a detectable force. A controlling apparatus selects which sensing result of a sensor should be used between sensing results of the first sensor 131 and the second sensor, and controls a robot arm by using the selected sensing result of the sensor.

22 Claims, 8 Drawing Sheets

(56) References Cited

U.S. PATENT DOCUMENTS

| | | | | |
|---|---|---|---|---|
| 5,946,449 A * | 8/1999 | Dickerson | B25J 9/1697 | 700/250 |
| 6,060,022 A * | 5/2000 | Pang | G01N 35/0095 | 422/63 |
| 6,308,113 B1 * | 10/2001 | Nowlin | B25J 9/1689 | 700/245 |
| 6,408,224 B1 * | 6/2002 | Okamoto | B25J 9/1661 | 29/721 |
| 7,987,021 B2 * | 7/2011 | Takaoka | B25J 9/1676 | 345/419 |
| 7,993,289 B2 * | 8/2011 | Quistgaard | A61B 5/6843 | 601/2 |
| 8,260,463 B2 * | 9/2012 | Nakamoto | B25J 5/00 | 700/259 |
| 8,365,615 B2 | 2/2013 | Sato et al. | | |
| 8,453,523 B2 * | 6/2013 | Sato | G01L 5/164 | 73/862.69 |
| 8,527,094 B2 * | 9/2013 | Kumar | G09B 23/28 | 700/259 |
| 8,786,613 B2 * | 7/2014 | Millman | G06T 13/20 | 345/473 |
| 8,862,269 B2 * | 10/2014 | Martinez | B25J 9/1687 | 200/245 |
| 9,162,359 B2 * | 10/2015 | Suyama | B25J 9/1676 | |
| 9,211,642 B2 * | 12/2015 | Nammoto | B25J 9/1612 | |
| 9,346,165 B1 * | 5/2016 | Metzger | B25J 9/1674 | |
| 9,375,841 B1 * | 6/2016 | Kemper | B25J 13/085 | |
| 9,427,872 B1 * | 8/2016 | Bingham | B25J 9/1692 | |
| 9,827,677 B1 * | 11/2017 | Gilbertson | B25J 9/1682 | |
| 9,869,597 B1 * | 1/2018 | Reich | G01L 5/0019 | |
| 2002/0128552 A1 * | 9/2002 | Nowlin | A61B 34/70 | 600/427 |
| 2004/0164697 A1 * | 8/2004 | Iribe | B25J 13/085 | 318/568.12 |
| 2005/0159840 A1 * | 7/2005 | Lin | B23P 6/002 | 700/245 |
| 2006/0036351 A1 * | 2/2006 | Hopkins | G05B 11/42 | 700/280 |
| 2007/0010913 A1 * | 1/2007 | Miyamoto | B25J 9/1658 | 700/264 |
| 2007/0067678 A1 * | 3/2007 | Hosek | G05B 23/0235 | 714/25 |
| 2007/0120512 A1 * | 5/2007 | Albu-Schaffer | B25J 9/1633 | 318/568.2 |
| 2007/0281149 A1 * | 12/2007 | Martens | C09J 5/00 | 428/336 |
| 2009/0058208 A1 * | 3/2009 | Kimura | H02K 5/1732 | 310/83 |
| 2009/0069937 A1 * | 3/2009 | Battenberg | B25J 9/1694 | 700/254 |
| 2009/0302626 A1 * | 12/2009 | Dollar | B25J 9/104 | 294/106 |
| 2010/0234857 A1 * | 9/2010 | Itkowitz | G09B 23/285 | 606/130 |
| 2010/0234996 A1 * | 9/2010 | Schreiber | B25J 13/085 | 700/258 |
| 2010/0234999 A1 * | 9/2010 | Nakajima | B25J 9/1628 | 700/261 |
| 2010/0300230 A1 * | 12/2010 | Helmer | B25J 9/106 | 74/469 |
| 2011/0015785 A1 * | 1/2011 | Tsusaka | B25J 9/0003 | 700/254 |
| 2011/0190932 A1 * | 8/2011 | Tsusaka | B25J 13/08 | 700/254 |
| 2011/0190933 A1 * | 8/2011 | Shein | B62D 55/075 | 700/258 |
| 2011/0218676 A1 * | 9/2011 | Okazaki | B25J 9/1075 | 700/260 |
| 2012/0012101 A1 * | 1/2012 | Trujillo | F24S 30/452 | 126/601 |
| 2012/0048027 A1 * | 3/2012 | Hashiguchi | B25J 9/0087 | 73/763 |
| 2012/0133318 A1 * | 5/2012 | Komatsu | B25J 9/1075 | 318/563 |
| 2012/0143212 A1 * | 6/2012 | Madhani | A61B 19/2203 | 606/130 |
| 2012/0185098 A1 * | 7/2012 | Bosscher | B25J 5/005 | 700/260 |
| 2012/0239198 A1 * | 9/2012 | Orita | B25J 9/1641 | 700/260 |
| 2012/0328395 A1 * | 12/2012 | Jacobsen | B25J 3/04 | 414/1 |
| 2013/0090880 A1 * | 4/2013 | Sato | B25J 9/1682 | 702/98 |
| 2013/0096862 A1 * | 4/2013 | Nakamura | G01D 5/347 | 702/94 |
| 2013/0110128 A1 * | 5/2013 | Schostek | A61B 1/00158 | 606/130 |
| 2013/0178978 A1 * | 7/2013 | Kim | G05D 3/00 | 700/251 |
| 2013/0345876 A1 * | 12/2013 | Rudakevych | B25J 9/1697 | 700/259 |
| 2014/0058406 A1 * | 2/2014 | Tsekos | A61B 34/30 | 606/130 |
| 2014/0067119 A1 * | 3/2014 | Gomi | B25J 9/1651 | 700/253 |
| 2014/0107843 A1 * | 4/2014 | Okazaki | B25J 13/085 | 700/260 |
| 2014/0114477 A1 * | 4/2014 | Sato | B25J 9/1664 | 700/250 |
| 2014/0201571 A1 * | 7/2014 | Hosek | G06F 11/2257 | 714/26 |
| 2014/0230581 A1 * | 8/2014 | Nakatani | G01L 5/009 | 73/865 |
| 2014/0277730 A1 * | 9/2014 | Nakamura | B25J 13/088 | 700/258 |
| 2014/0277847 A1 * | 9/2014 | Cann | B25J 5/007 | 701/2 |
| 2015/0120049 A1 * | 4/2015 | Motoyoshi | B25J 9/1633 | 700/258 |
| 2015/0127158 A1 * | 5/2015 | Shimodaira | G05B 19/401 | 700/258 |
| 2015/0198467 A1 * | 7/2015 | Nakamura | G01D 5/34715 | 250/231.14 |
| 2015/0224638 A1 * | 8/2015 | Dockter | B25J 3/04 | 700/264 |
| 2015/0224639 A1 * | 8/2015 | Dockter | B25J 3/04 | 700/264 |
| 2016/0023647 A1 * | 1/2016 | Saunders | B25J 3/04 | 701/22 |
| 2016/0279796 A1 * | 9/2016 | Naitou | B25J 9/1676 | |
| 2016/0311111 A1 * | 10/2016 | Ogawara | B25J 9/1633 | |
| 2017/0183047 A1 * | 6/2017 | Takagi | B25J 9/1664 | |

* cited by examiner

ROBOT APPARATUS, METHOD FOR CONTROLLING ROBOT, PROGRAM, AND RECORDING MEDIUM

BACKGROUND OF THE INVENTION

Field of the Invention

The present invention relates to a robot apparatus provided with a robot arm that has a plurality of sensors of which the detectable ranges for a force are different from each other; a method for controlling a robot; a program; and a recording medium.

Description of the Related Art

Along with a development of a robot technology, such a tendency is growing as to use a robot apparatus which operates automatically according to a control program, for production use of articles. Among the above articles, as regarding the production of articles for which an assembling operation is required, a robot apparatus in which a force can be controlled is progressively introduced. For instance, a robot apparatus is known which has a sensor such as a force sensor arranged therein, for finding a force exerted on an end portion of a robot arm (occasionally referred to as force sensor in the present specification). In addition, a robot apparatus is known which has a sensor such as a torque sensor arranged therein, for finding a force exerted on each joint of a robot arm (occasionally referred to as torque sensor in the present specification). These robot apparatuses can control the force (control an orientation) exerted on a robot containing its end-effector, when assembling parts by the robot, by sensing an external force generated in an end-effector at the time of an assembling work.

The robot apparatus which has a sensor such as a force sensor arranged in the end portion of the robot arm can arrange the sensor near the end-effector, and accordingly can sense the external force generated at the time of the assembling work, with little loss. By sensing the fine external force by this sensor, the robot apparatus enables precise force control.

The robot apparatus which has a sensor such as a torque sensor arranged in each joint of the robot arm can sense the external force, even when a contact object comes in contact with not only the end-effector but also anywhere of the whole robot, by arranging the sensor in each joint. On the other hand, there is a case where it is difficult for the robot apparatus to sense the fine external force with high precision and control the force precisely, due to losses such as friction in a driving portion of each joint, an influence of an inertia force of the robot arm itself, and the like.

In the future, along with a further progress of automated production, there is a possibility that a work range which is required to the robot arm increases, for instance, to such an extent that one robot arm assembles one product. For instance, in electrical products, the work range includes a wide range from an assembly of flexible parts such as a flexible cable, to an assembly of rigid-body parts of metal or the like. In the viewpoint of the force control, the robot apparatus results in being needed which copes with forces from the fine external force to a large external force.

Conventionally, a method has been proposed which determines an appropriate force control parameter according to a variation of a working object and performs force control of a robot (see Japanese Patent Application Laid-Open No. H02-139190). In this Japanese Patent Application Laid-Open No. H02-139190, it is described that parameters are changed for each working object, which include a force feedback gain and a gain of a compensator necessary for the force control, a filter constant, a width of a dead zone and a servo period.

However, a detectable range of a sensor is limited which senses the external force, and accordingly when a parameter is only changed for each working object of the above described force control robot, there have been the following problems.

(1) When the sensor is used which can sense a large external force, the sensing result of a fine external force is buried in noises, and there is a region in which the force cannot be controlled with high precision.

(2) When the sensor is used which can sense a fine external force, the sensing result of a large external force is saturated, and there is a region in which the force cannot be controlled with high precision.

Then, an object of the present invention is to sense forces from the fine external force to the large external force with high precision, and enable high-precision control.

SUMMARY OF THE INVENTION

According to an aspect of the present invention, a robot apparatus comprises: a multi-joint robot arm; an end-effector which is supported by an end portion of the robot arm; and a controlling unit which controls an operation of the robot arm, wherein the robot arm has a plurality of sensors which are arranged for sensing a force acting on the robot arm or the end-effector and of which detectable ranges are different from each other, and the controlling unit selects which sensing result of the sensor should be used among the sensing results of the plurality of sensors, and controls the robot arm by using the selected sensing result of the sensor.

According to the present invention, since the sensing result of the sensor is selectively used to control the force acting on the robot arm, an external force can be sensed in a wide range from weak external force to a strong external force, to force-control the robot arm in a high accuracy.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[First Embodiment]

Figure 1:
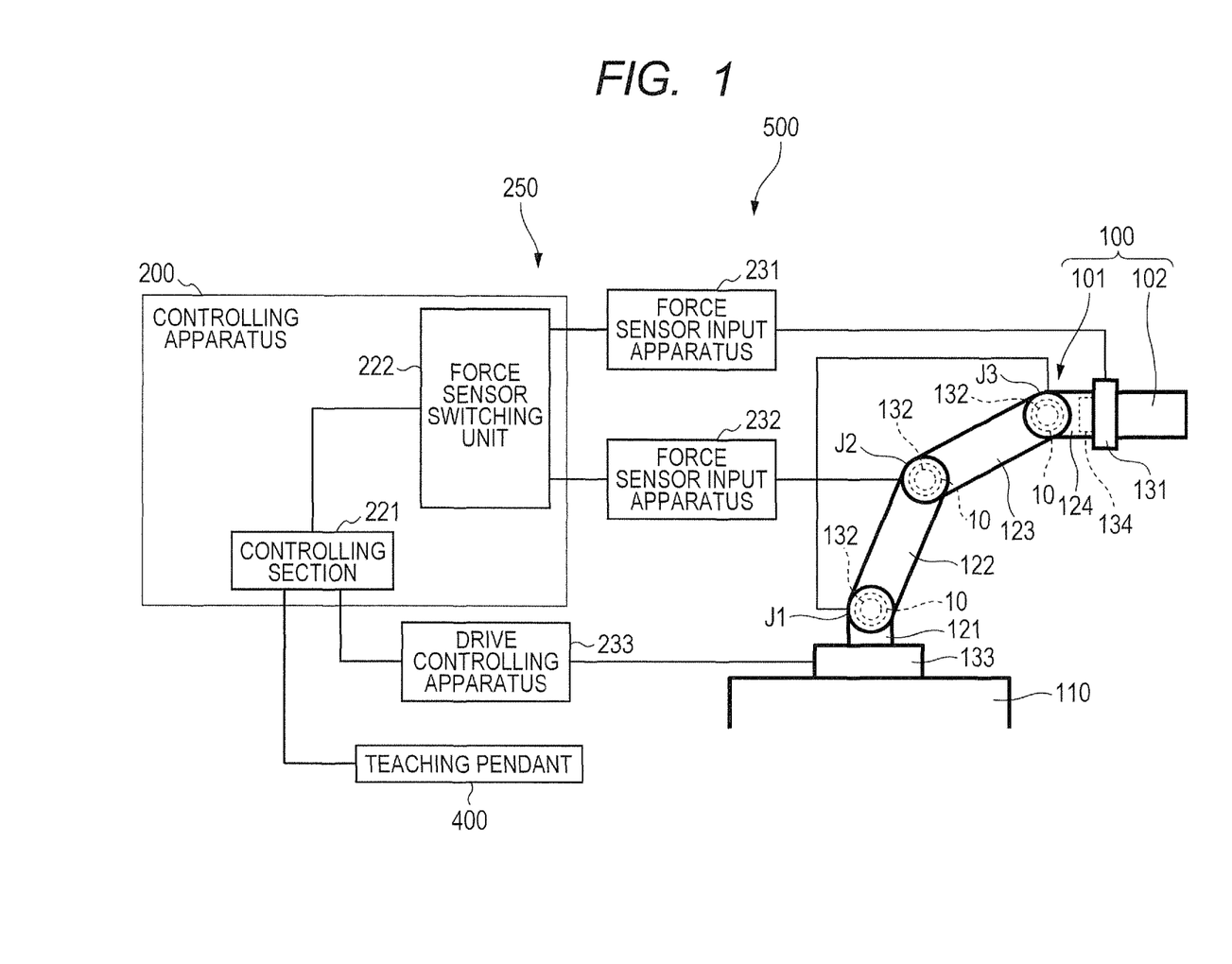
FIG. 1 is an explanatory view illustrating a robot apparatus according to a first embodiment of the present invention.

FIG. 1 is an explanatory view illustrating a robot apparatus according to a first embodiment of the present invention. The robot apparatus 500 illustrated in FIG. 1 includes a multi-joint type robot 100 which performs an operation of an assembly or the like, a controlling system 250 which controls the robot 100, a teaching pendant 400 which can teach the robot 100 by an operation of an operator.

The robot 100 has a robot arm 101. The robot arm 101 has an end portion (wrist portion) 131 which is a free end, and a base end portion 133 which is a fixed end portion. The robot 100 includes a robot hand 102 which is an end-effector that is attached to the end portion 131 of the robot arm 101 and is consequently supported by the end portion 131 of the robot arm 101.

The robot arm 101 is a vertical multi-joint type robot arm, and has the base portion 133 which is the base end portion fixed to a horizontal plane of a trestle 110, and a plurality of links 121 to 124 which transmit displacement and a force. The link 121 is fixed to the base portion 133. The plurality of links 121 to 124 are pivotably and rotatably connected to each other by a plurality of joints J1 to J3. A driving apparatus 10 is provided in each joint J1 to J3 of the robot arm 101. Driving apparatuses which have appropriate output corresponding to a size of a necessary torque are used for the driving apparatuses 10 of each joint J1 to J3, and in the first embodiment, have each an electric motor which is a driving source and a speed reducer connected to the electric motor.

A first sensor for finding (sensing) a force acting on the robot hand 102 (external force) is arranged on the end portion 131 of the robot arm 101. Second sensors 132 for finding (detecting) a force acting on each joint J1 to J3 of the robot arm 101 (external force) are arranged in the joints J1 to J3 of the robot arm 101, respectively.

In the present specification, the first sensor arranged in the end portion of the robot arm and the second sensor arranged in each joint J1 to J3 of the robot arm 101 are occasionally referred to also as a force sensor.

The robot hand 102 has a plurality of holding pawls which hold a work, an unillustrated driving apparatus which drives a plurality of holding pawls, an unillustrated encoder which detects a rotation angle of the unillustrated driving apparatus, and an unillustrated mechanism which converts the rotation into a holding operation. This unillustrated mechanism is designed so as to match the holding operation which is necessary in a cam mechanism, a link mechanism and the like. Incidentally, a torque necessary for the unillustrated driving apparatus which is used for the robot hand 102 is different from a torque for the joint of the robot arm 101, but the basic structures are same.

The robot arm 101 will be described below while the joint J1 is taken as a representative example, and the description concerning other joints J2 and J3 will be omitted, because the size and the performance of the joints J2 and J3 are occasionally different from those of the joint J1, but the structures are similar.

Figure 2:
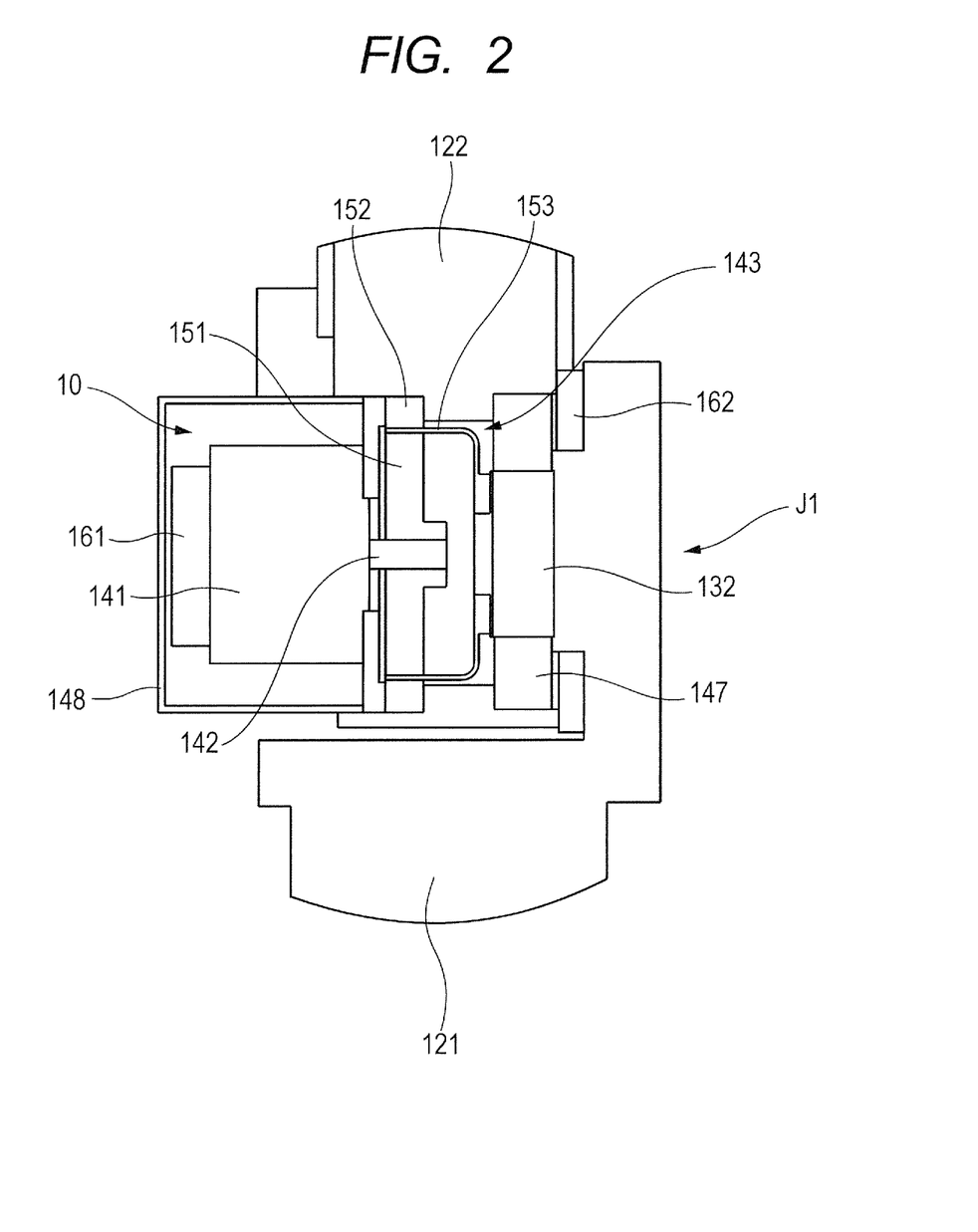
FIG. 2 is a partial sectional view illustrating a joint of a robot arm.

FIG. 2 is a partial sectional view illustrating the joint J1 of the robot arm 101. The driving apparatus 10 has a rotary motor (hereinafter referred to as "motor") 141 which is an electric motor, a speed reducer 143 which deaccelerates the rotation of a rotary shaft 142 of a motor 141.

An encoder 161 which detects a rotation angle of the motor 141 is arranged on either one shaft of the rotary shaft 142 of the motor 141 and an input shaft of the speed reducer 143, and in the case of the first embodiment, is arranged on the rotary shaft 142 of the motor 141. An encoder 162 is arranged in the joint J1, which detects an angle of an output shaft of the speed reducer 143, in other words, an angle of the joint J1.

The motor 141 is a servo motor, for instance, a brushless DC servo motor or an AC servo motor.

An absolute-type rotary encoder is desirable for the encoder 161, which is configured so as to have an encoder of the absolute angle of one rotation, a counter for counting a total number of rotations in the encoder of the absolute angle, and a backup battery which supplies an electric power to the counter. Even if an electric power supply to the robot arm 101 is shut off, as long as this backup battery is effective, the total number of rotations is held in the counter, regardless of ON and OFF of the electric power supply to the robot arm 101. Accordingly, an orientation of the robot arm 101 can be controlled. Incidentally, the encoder 161 is attached to the rotary shaft 142, but may be attached to the input shaft of the speed reducer 143.

The encoder 162 is a rotary encoder which detects a relative angle between two adjacent links. In the joint J1, the encoder 162 is the rotary encoder which detects the relative angle between the link 121 and the link 122. The encoder 162 has a configuration in which an encoder scale is provided on the link 121 and a detecting head is provided on the link 122, or has a reversed configuration.

In addition, the link 121 and the link 122 are pivotally connected through a cross roller bearing 147.

In addition, the second sensor 132 is arranged between the link 121 and the link 122.

The speed reducer 143 is, for instance, a speed reducer with a wave motion gear, which is small and lightweight, and has a large reduction ratio. The speed reducer 143 is provided with a web generator 151 which is an input shaft and is connected with the rotary shaft 142 of the motor 141, and a circular spline 152 which is an output shaft and is fixed to the link 122. Incidentally, the circular spline 152 is directly connected to the link 122, but may be formed integrally with the link 122.

In addition, the speed reducer 143 is arranged between the web generator 151 and the circular spline 152, and is provided with a flexible spline 153 which is fixed to the link 121. The flexible spline 153 is deaccelerated by a reduction ratio of N with respect to the rotation of the web generator 151, and rotates relatively to the circular spline 152. Accordingly, the rotation of the rotary shaft 142 of the motor 141 is deaccelerated by a reduction ratio of 1/N in the speed reducer 143, relatively rotates the link 122 to which the circular spline 152 is fixed, with respect to the link 121 to which the flexible spline 153 is fixed, and inflects the joint J1.

A position detecting portion is formed of at least one of the encoder 161 and the encoder 162 which are arranged in each of the joints J1 to J3. Specifically, the position (including orientation) of the end portion 131 of the robot arm 101 can be calculated (detected) from the values of the encoders 161 or the encoders 162 in each of the joints J1 to J3.

A controlling system 250 includes: a controlling apparatus 200 which is a controlling unit that is formed of a computer; a force sensor input apparatus 231 which is a first sensor input apparatus; a force sensor input apparatus 232 which is a second sensor input apparatus; and a drive controlling apparatus 233. In the present embodiment, the controlling apparatus 200 performs force control (impedance control) at the time when performing a fitting operation with the robot 100.

The first sensor 131 is a force sensor having, for instance, six shafts, and senses three force components of Fx, Fy and Fz which are perpendicular to the others, and three moments of Mx, My and Mz acting around these shafts. The force and the moment which this first sensor 131 senses are hereafter referred to simply as "force".

The first sensor 131 has a plurality of sensing elements which are not illustrated. Sensed signals in each sensing element of the first sensor 131 are output to the force sensor input apparatus 231. The force sensor input apparatus 231 calculates the force (external force) generated in the first sensor 131 based on each of the sensed signals, and outputs the calculation result (sensing result) to the controlling apparatus 200. Thus, the first sensor 131 senses the force which has acted on the robot hand 102.

A force sensor which is described, for instance, in Japanese Patent Application Laid-Open No. 2009-075083 can be used as the first sensor 131, but the first sensor 131 is not limited to the force sensor, and any sensor can be used as long as the sensor can find the force (external force) which acts on the robot hand 102.

Figure 10A:
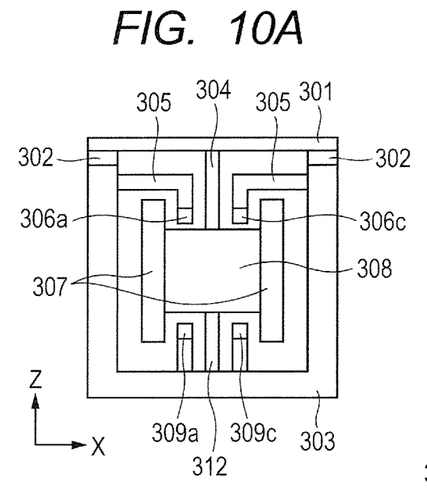
FIGS. 10A and 10B are explanatory views illustrating one example of a first sensor.

Next, one example of the first sensor 131 will be described with reference to FIGS. 10A and 10B. FIG. 10A is a sectional view along an X-Z axis of the sensor, and FIG. 10B is an exploded perspective view.

Figure 10B:
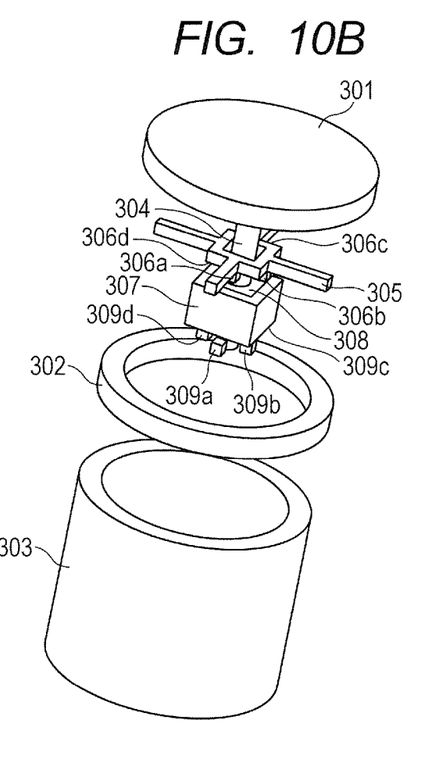

In FIGS. 10A and 10B, the force is exerted on an action portion 301. The positional displacement is produced in an elastic body 302 when the force has been exerted on the action portion 301. An outer frame 303 of the force sensor is shown. A column 304 is shown which supports the action portion and a magnetic flux generating source. A supporting portion 305 for the sensing element is shown, which mounts the sensing element thereon. Sensing elements 306a to 306d are shown which detect a change of the magnetic flux in the magnetic flux generating source. A magnetic body 307 controls a flow of the magnetic flux. A magnetic flux generating source 308 generates the magnetic flux. Sensing elements 309a to 309d detect the change of the magnetic flux of the magnetic flux generating source. The action portion 301 is connected and fixed to the magnetic flux generating source 308 through a column 304 having high rigidity. In addition, sensing elements 306a to 306d are fixed to the outer frame 303 through the supporting portion 305 for the sensing elements while having spaces between themselves and the magnetic flux generating source 308, and sensing elements 309a to 309d are similarly fixed to the outer frame while having spaces between themselves and the magnetic flux generating source 308.

Then, the outer frame 303 and the action portion 301 are elastically supported by each other through an elastic body 302 so as to be capable of forming displacement.

In addition, a supporting portion 312 for the magnetic flux generating source is formed of a substance having low rigidity such as an elastic body, and is arranged in a position opposing to a column 304 so as to hold the orientation of the magnetic flux generating source 308. If such a structure is adopted, when a force is exerted on the action portion 301 and the orientation changes with respect to the outer frame, the orientation of the magnetic flux generating source 308 also changes so as to follow the change of the orientation, and a relative position to the sensing element changes which is fixed to the outer frame 303.

The magnetic flux generating source 308 may be a permanent magnet which is represented by an Nd—Fe—B magnet, a Sm—Co magnet, a Sm—Fe—N magnet and a ferrite magnet, or may also be an electromagnet which winds a coil around a magnetic body, passes an electric current in the coil and thereby makes the magnetic body generate magnetism. The sensing elements 306 and 309 are a Hall element, an MR element, a magnetic impedance element, a flux gate element or the like. The magnetic body 307 is formed from a material having different magnetic permeability from that of the air.

When a force is exerted on the action portion 301, the magnetic flux generating source 308 attached to the column 304 produces displacement due to the elastic body 302. Thereby, the electrical displacement is obtained which is proportional to the amount of the displacement of the magnetic flux generating source 308, from the sensing element.

Each of the second sensors 132 is, for instance, a torque sensor, and is used for sensing the force and the moment (torque) which are generated in each of the joints J1 to J3, respectively. The force and the moment (torque) which act on this second sensor 132 are hereafter referred to as "force".

Each of the second sensors 132 has an unillustrated sensing element. Sensed signals are output from the sensing elements of each of the second sensors 132 to the force sensor input apparatus 232. The force sensor input apparatus 232 calculates forces (external force) generated in each of the force sensors 132 based on each of the sensed signals, and outputs the calculation result (sensing result) to the controlling apparatus 200. Thus, the second sensor 132 senses the force which has acted on the joints J1 to J3.

The second sensors 132 arranged in each of the joints J1 to J3 can employ any sensor, as long as the sensor can obtain the force (external force) which acts on each of the joints J1 to J3, respectively.

Next, one example of the second sensor 132 will be described with reference to FIG. 11.

Figure 11:
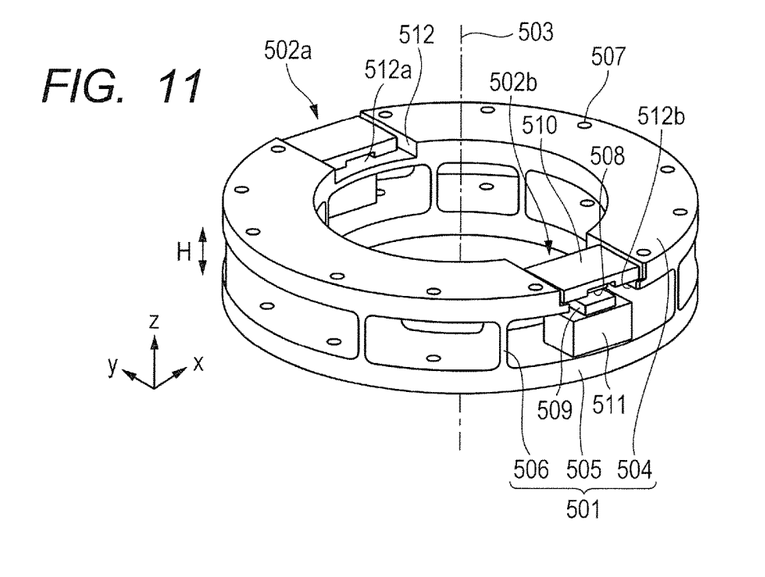
FIG. 11 is an explanatory view illustrating one example of a second sensor.

The second sensor is formed of an elastic body 501 and each unit of optical encoders 502a and 502b, as is illustrated in FIG. 11. The optical encoders 502a and 502b are arranged in the respective facing positions that occupy the positions, for instance, on the same diameter of the concentric circle of which the center is a rotation axis 503, and on which the torque acts against the elastic body 501.

The elastic body 501 includes: a first fastening portion 504; a second fastening portion 505; and a spring portion 506 which connects both of the above portions to each other and is radially arranged. In the example of FIG. 11, a scale fixing portion 512 is provided in the first fastening portion 504.

Each part of the elastic body 501 is formed from a predetermined material which has an elastic (spring) coefficient according to an objective torque detection range, a resolution necessary for the range, and the like; and for instance, is a material of resin or metal (steel material, stainless steel and the like).

The first fastening portion 504 and the second fastening portion 505 are structured to have a shape, for instance, of a circle or a doughnut (ring) form as illustrated in the figure.

These fastening portions (504 and 505) each form such flange parts as to be fastened to measurement objects which are relatively displaced from each other, for instance, are the link 122 and the speed reducer 143 at a side of the link 121 in FIG. 2, respectively.

The spring portion 506 is structured as a member having a rib shape which connects the first fastening portion 504 having, for instance, a circular shape or a ring shape, to the second fastening portion 505. A plurality of spring portions 506 are radially arranged, while regarding the rotation axis 503 on which the torque acts as the center.

The spring portions 506 are arranged radially with respect to the rotation axis 503 on which the torque acts, for instance, in two or more (eight in this example) places. In addition, in the first fastening portion 504 and the second fastening portion 505, a plurality (eight in this example) of fastening parts 507 (for instance, bis hole or tap hole) are arranged for fastening the portions therethrough to the motor 141 and the link, respectively.

The optical encoder 502a (502b) has a function working as an optical position sensor (encoder). As is illustrated in FIG. 11, the optical encoder 502a (502b) is provided with a scale 508 (scale portion), a sensing element 509 which detects positional information from the scale 508. The sensing element 509 forms an optical detecting portion which detects the relative rotation displacement between the first fastening portion 504 and the second fastening portion 505.

The scale 508 (scale portion) and the sensing element 509 are mounted on the first fastening portion 504 and the second fastening portion 505, through a scale mounting portion 510 and a sensing element mounting portion 511, respectively.

The scale 508 (scale portion) is fixed to the elastic body 501 through the scale mounting portion 510, and the sensing element 509 is fixed to the elastic body 501 through the sensing element mounting portion 511, respectively.

In the present example, the scale mounting portion 510 is fixed to the elastic body 501, at a scale fixing portion 512. As is illustrated in FIG. 11, the whole scale fixing portion 512 has a shape of a recess portion 512a which is provided in the first fastening portion 504. The outer circumferential side of this recess portion 512a becomes a notched portion 512b (aperture portion) for making the scale 508 face the sensing element 509.

In addition, the sensing element mounting portion 511 is fixed to the second fastening portion 505 of the elastic body 501. The sensing element 509 is formed of a reflection-type optical sensor provided with an unillustrated light-emitting element and a light-receiving element. In a pattern face of the scale 508, which faces the sensing element 509, a scale pattern (though details are unillustrated) is arranged on the surface. This scale pattern is formed in which a particular pattern is arranged in which concentration difference or reflectivity, for instance, is regularly varied.

Incidentally, in this scale pattern, not only one streak of the contrast pattern but also two or more streaks (for instance, having different arrangement phase from each other) can be arranged, depending on a method of a detecting computation. A pitch of the scale pattern is determined according to a resolution which is needed for detecting the position, but in recent years, a pitch of a μm-order can also be used along with a tendency of higher precision and higher resolution of the encoder.

The sensing element 509 irradiates the scale 508 with light emitted from the light-emitting element, and a light-receiving element receives the light reflected from the scale 508. Here, when the torque acts around the rotation axis 503, and the elastic body 501 is deformed in a direction of an X-axis, relative positions of the sensing element 509 and the scale 508 change, and accordingly the position irradiated with the light which irradiates the scale 508 moves on the scale 508.

At this time, the light which irradiates the scale 508 passes on the pattern that is provided on the scale 508, and then the quantity of light changes which is detected by the light-receiving element of the sensing element 509. The amount of relative movement between the scale 508 and the sensing element 509 is detected from this change of the quantity of light. The amount of the movement, which the sensing element 509 has detected, is converted into a torque which has acted on the elastic body 501, by a torque-detecting controlling section (unillustrated) which includes a control routine that a CPU (unillustrated) executes. Incidentally, this torque-detecting controlling may be also performed by a torque-detecting controlling section which includes a hardware. An output value (amount of movement) of the sensing element 509 is converted into a detected torque value, for instance, with the use of a sensitivity coefficient that converts the amount of the movement, which the sensing element 509 has detected by the above described torque-detecting controlling section, into the torque that has acted on the elastic body 501. Then, a calculation result (sensing result) is output to the controlling apparatus 200.

A teaching pendant 400 is configured so as to be capable of being connected to the controlling apparatus 200, and is configured so as to be capable of sending an operation instruction which controls the driving of the robot arm 101 and the robot hand 102, and the data of teaching points, to the controlling apparatus 200, when having been connected to the controlling apparatus 200.

Here, parameters for expressing the flexibility of the robot arm 101 shall be determined as joint angles, and each joint angle of the joints J1 to J3 of the robot arm 101 shall be determined as $\theta_1$, $\theta_2$ and $\theta_3$, respectively. The configuration of the robot arm 101 is expressed by ($\theta_1$, $\theta_2$, $\theta_3$), and can be regarded as one point on a joint space. Thus, when the parameter which expresses the flexibility of the robot arm 101 (for instance, joint angle and length of extension and contraction) is determined to be a value on coordinate axes, the configuration of the robot arm 101 can be expressed as a point on the joint space. In other words, the joint space is a space on the coordinate axes to which the joint angles of the robot arm 101 correspond.

In addition, a tool center point (TCP) is already set in the end portion 131 of the robot arm 101. The TCP is expressed by three parameters (x, y, z) which express a position, and three parameters ($\alpha$, $\beta$, $\gamma$) which express an orientation (rotation), in other words, by six parameters (x, y, z, $\alpha$, $\beta$, $\gamma$), and can be regarded as one point on a task space. In other words, the task space is a space specified by these six coordinate axes.

The teaching point is set in the controlling apparatus 200 as a point on the joint space or on the task space, by the teaching pendant 400 which an operator operates.

The controlling apparatus 200 generates a path of the robot arm 101, which connects a plurality of set teaching points, according to a predetermined interpolation method (for instance, linear interpolation, circular interpolation, joint interpolation or the like). Then, the controlling apparatus 200 generates a trajectory of the robot arm 101 from the generated path of the robot arm 101.

Here, the path of the robot arm 101 is an ordered set of the points in the joint space or in the task space. The trajectory of the robot arm 101 is a trajectory which shows a path by using a time period as a parameter, and is a set of angle instructions (operation instruction) to each of the joints J1 to J3 of the robot arm 101 on each time period, in the first embodiment.

The controlling apparatus 200 oversees and controls the whole robot apparatus 500. When operating a position control, the controlling apparatus 200 outputs a generated operation instruction to a drive controlling apparatus 233. When operating a force control, the controlling apparatus 200 corrects the operation instruction, based on the force sensing result which has been output from the force sensor input apparatuses 231 and 232, and outputs the corrected operation instruction to the drive controlling apparatus 233. For instance, when operating the force control, the controlling apparatus 200 corrects the operation instruction so that a force in a predetermined direction becomes smaller, based on the force sensing result which has been output from the force sensor input apparatuses 231 and 232, and outputs the corrected operation instruction to the drive controlling apparatus 233.

The drive controlling apparatus 233 supplies an electric current corresponding to the operation instruction to the motor 141 provided in each of the joints J1 to J3 of the robot arm 101, and operates the motor 141 to operate the robot arm 101. In other words, the controlling apparatus 200 controls an operation of the robot arm 101.

Figure 3:
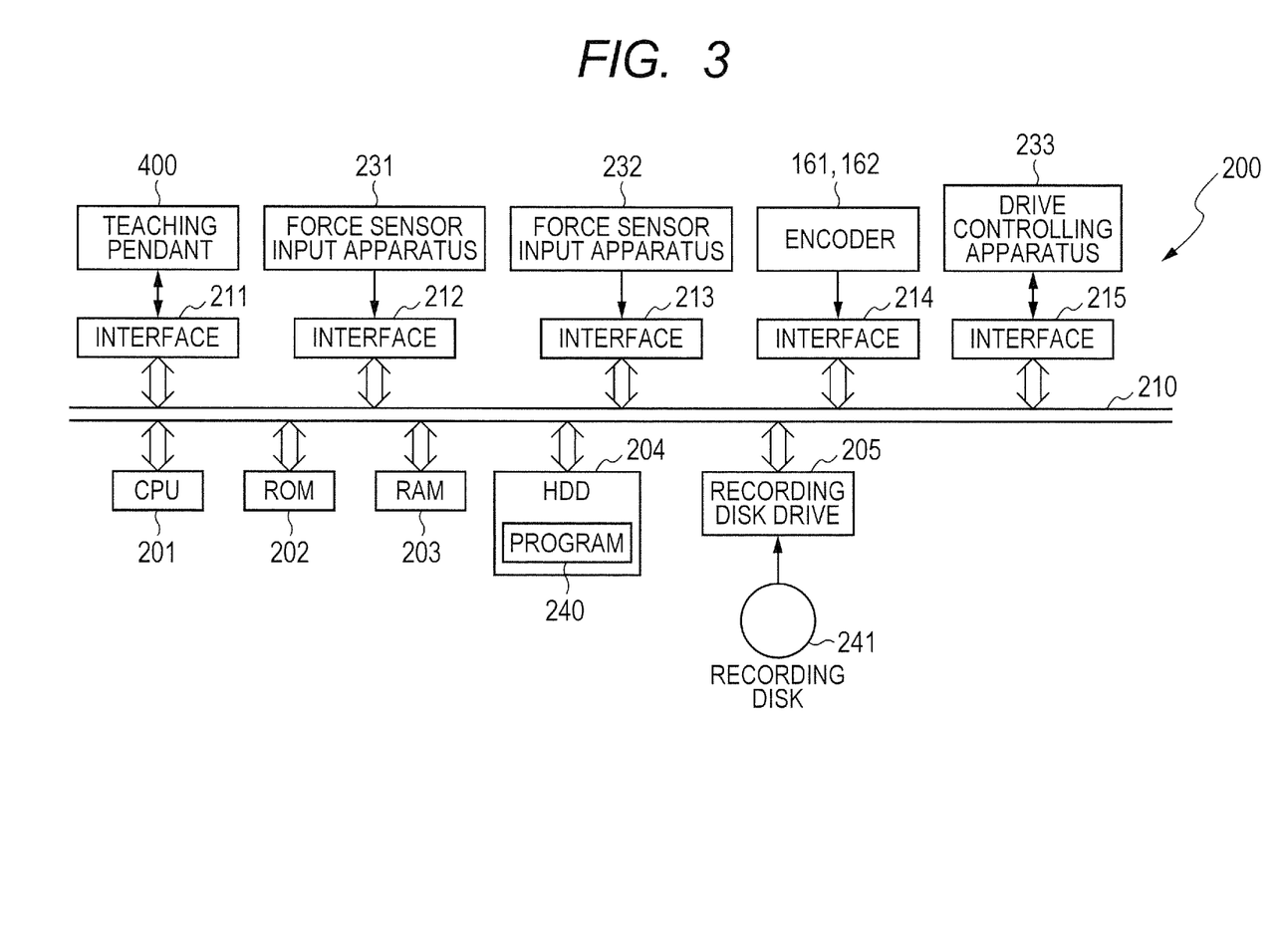
FIG. 3 is a block diagram illustrating a configuration of a controlling apparatus.

FIG. 3 is a block diagram illustrating the configuration of the controlling apparatus 200. The controlling apparatus 200 has a CPU (Central Processing Unit) 201 which functions as an arithmetic section. In addition, the controlling apparatus 200 has a ROM (Read Only Memory) 202, a RAM (Random Access Memory) 203, and an HDD (Hard Disk Drive) 204, as a memory unit. In addition, the controlling apparatus 200 has a recording disk drive 205, and various types of interfaces 211 to 215.

The ROM 202, the RAM 203, the HDD 204, the recording disk drive 205, and various types of the interfaces 211 to 215 are connected to the CPU 201 through a bus 210. A basic program such as a BIOS is stored in the ROM 202. The RAM 203 is a storage device which temporarily stores various data therein such as a result of arithmetic processing of the CPU 201.

The HDD 204 is a storage device which stores a result of the arithmetic processing of the CPU 201, and the various data and the like obtained from the outside; and is also a recording device which records a program 240 for making the CPU 201 execute various arithmetic processing that will be described later. The CPU 201 executes each step of a method for controlling the robot, based on the program 240 recorded (stored) in the HDD 204. Specifically, by executing the program 240, the CPU 201 functions as a robot controlling section (hereafter referred to as "controlling section") 221 illustrated in FIG. 1 and a force sensor switching unit 222.

The recording disk drive 205 can read out various data, a program and the like which are recorded in a recording disk 241.

The teaching pendant 400 which is a teaching section is connected to the interface 211. The teaching pendant 400 can appoint the teaching point at which the teaching pendant teaches the robot 100 (robot arm 101), in other words, can appoint a target joint angle (or target position and orientation of TCP) of each of the joints J1 to J3, by an input operation of a user. The data on the teaching point is output to the CPU 201 or the HDD 204 through the interface 211 and the bus 210. The CPU 201 receives the input of the data on the teaching point from the teaching pendant 400 or the HDD 204.

The force sensor input apparatus 231 is connected to the interface 212, and the force sensor input apparatus 232 is connected to the interface 213. Thereby, the CPU 201 can acquire the force sensing result sensed by the first sensor 131, and can acquire the force sensing result sensed by the second sensor 132.

The encoders 161 and 162 are connected to the interface 214. A pulse signal which shows a detection value of a detected angle is output from the encoders 161 and 162. The CPU 201 receives the input of the pulse signal sent from the encoders 161 and 162, through the interface 212 and the bus 210. Incidentally, the joint angle of each of the joints J1 to J3 is an angle detected by the encoder 162, or (an angle detected by the encoder 161)×(1/N). Therefore, the CPU 201 can determine an operation position of the robot arm 101 from the detecting angle of either one of the encoders. Specifically, the position detecting portions of the encoder 161 or the encoder 162 in each of the joints J1 to J3 result in detecting the operation position of the robot arm 101, and the CPU 201 results in acquiring the detection result of the operation position of the robot arm 101.

The drive controlling apparatus 233 is connected to the interface 215. The CPU 201 generates an operation instruction which shows the control amount of a rotation angle of the rotary shaft 142 of the motor 141, based on the data on given teaching points. Then, the CPU 201 outputs an operation instruction to the drive controlling apparatus 233 through the bus 210 and the interface 215, at predetermined time intervals. Thereby, the CPU 201 controls the operation position of the robot arm 101 by the operation instruction.

The external storage device which is unillustrated, such as a rewritable nonvolatile memory and an external HDD, may be connected to the bus 210 through the unillustrated interface.

Incidentally, in the first embodiment, the case will be described where the computer-readable recording medium is the HDD 204, and the program 240 is stored in the HDD 204, but the present invention is not limited to the case. The program 240 may be recorded in any recording medium, as long as the recording medium can be read out by a computer. For instance, the ROM 202 and the recording disk 241 which are illustrated in FIG. 3, an unillustrated external storage device and the like may be used as the recording medium for supplying the program 240. Specific usable examples of the recording medium are described to include a flexible disk, a hard disk, an optical disk, a photomagnetic disk, a CD-ROM, a CD-R, a magnetic tape, a nonvolatile memory and a ROM.

In the first embodiment, a detectable range of a force which the first sensor 131 can detect is different from a detectable range of a force which the second sensor 132 can detect. In the first embodiment, the upper limit (rating) of the detectable range of the first sensor 131 is smaller than that of the second sensor 132. For instance, the detectable range of the first sensor 131 is 0 [N] or more and 10 [N] or less, and the detectable range of the second sensor 132 is 0 [N] or more and 100 [N] or less. The detectable range of each of the second sensors 132 shall be the same.

Here, the rating and the resolution in each of the first sensor 131 and the second sensor 132 have a relation of a trade-off. Specifically, the second sensor 132 having a high rating results in having a low resolution, and the first sensor 131 having a low rating results in having a high resolution.

The first sensor 131 having the low rating can measure a fine external force which is buried in noises and resists being measured in the case of the second sensor 132 having the high rating, and accordingly can be configured so as to be suitable for an operation process of flexible parts to be assembled, for which a fine external force is required. The second sensor 132 having the high rating can measure such an external force as to exceed a measurement range of the first sensor 131 having the low rating, and accordingly the second sensor 132 can be configured so as to be suitable for an operation process of parts to be assembled such as a rigid body, for which an external force of a high load is required.

As the position of the sensor is closer to the robot hand 102 which holds the parts, the sensor can sense an external force occurring at the time of the assembling work, with a less loss, and further resists being affected by an inertia force of the robot arm 101 itself. For this reason, in the first embodiment, the first sensor 131 arranged in the end portion of the robot arm 101 is determined to be the sensor having the low rating and the high resolution, which can utilize the performance effectively. On the other hand, the second sensor 132 arranged in each of the joints J1 to J3 is determined to be the sensor having the high rating, and thereby has a configuration suitable for sensing the external force of the high load. Therefore, in the first embodiment, two types of sensors 131 and 132 are arranged in the same robot arm 101.

When the robot 100 performs an operation process of the high load, approximately the same external force results in being exerted on both of the first sensor 131 having the low rating and the second sensor 132 having the high rating. Generally, as for the sensor for obtaining a force, a withstand load becomes smaller as the rating is lower. Therefore, in the first embodiment, a protecting mechanism 134 against an overload is provided in the first sensor 131 having the low rating. Due to this protecting mechanism 134, the first sensor 131 having the low rating can bear the operation process at the time of the high load.

Figure 4:
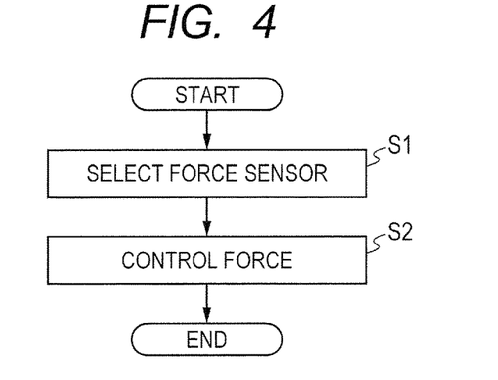
FIG. 4 is a flow chart which illustrates each step in a method for controlling a robot in the robot apparatus according to the first embodiment of the present invention.

FIG. 4 is a flow chart which illustrates each step in a method for controlling a robot in the robot apparatus according to the first embodiment of the present invention. In the first embodiment, the CPU 201 executes the program 240, and thereby functions as the controlling section 221 and the force sensor switching unit 222 which are illustrated in FIG. 1.

Firstly, the controlling section 221 selects which force sensing result should be used between force sensing results of the sensors of the first sensor 131 and the second sensor 132 (S1: selecting step). Specifically, the controlling section 221 sends a switching signal to the force sensor switching unit 222, and the force sensor switching unit 222 which has received the switching signal selects the force sensor input apparatus 231 or the force sensor input apparatus 232 according to the switching signal. The force sensor switching unit 222 transmits the force sensing result (output result) of the selected sensor to the controlling section 221.

Next, the controlling section 221 performs the force control (impedance control) of the robot arm 101 by using the force sensing result of the sensor selected in the step S1 (S2: force control step). In this case, the controlling section 221 outputs an operation instruction to the drive controlling apparatus 233, and the drive controlling apparatus 233 makes the robot arm 101 operate according to the operation instruction.

When the external force generated in the first sensor 131 and the second sensor 132 is small, the controlling section 221 selects a sensing result of the first sensor 131 having the low rating and the high resolution, and sends the switching signal to the force sensor switching unit 222. On the other hand, when the external force generated in the first sensor 131 and the second sensor 132 is large, the controlling section 221 selects a sensing result of the second sensor 132 having the high rating and the low resolution, and sends the switching signal to the force sensor switching unit 222.

Figure 5:
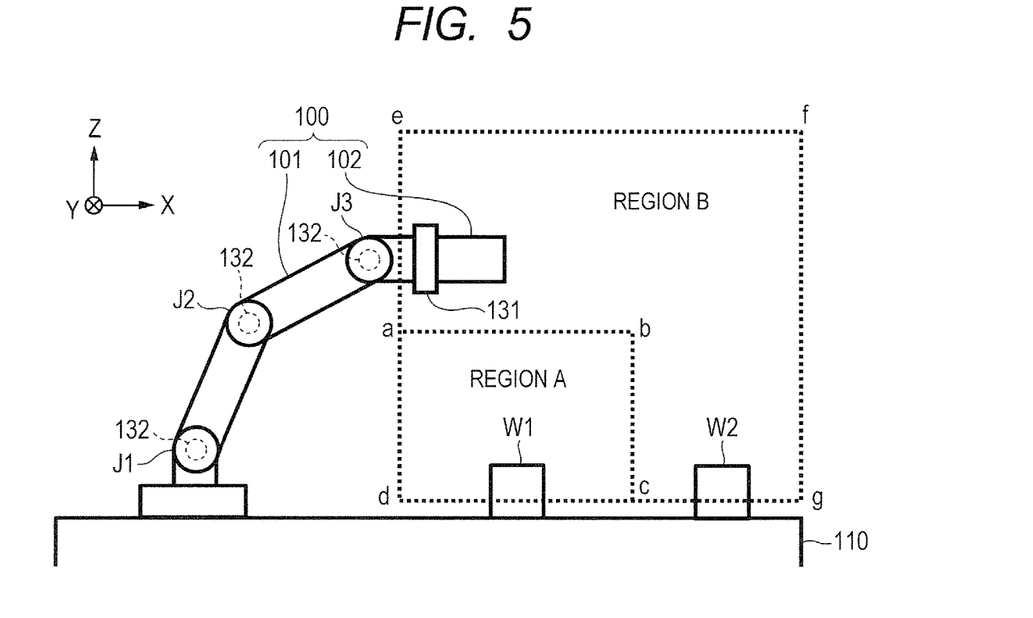
FIG. 5 is a view for describing the method for controlling the robot by a controlling apparatus according to the first embodiment of the present invention.

The controlling operation of the controlling apparatus 200 in the first embodiment will be described below in detail. FIG. 5 is a view for describing the method for controlling the robot by the controlling apparatus 200 according to the first embodiment of the present invention. A method for switching the sensor will be described below, from an operation region of the robot.

The controlling section 221 sets a region A which is the first region and a region B which is the second region, in a region of a three-dimensional space in X-Y-Z coordinates, in which the end portion 131 (robot hand 102) of the robot arm 101 can operate. Incidentally, in FIG. 5, the region A and the region B on an X-Z plane are illustrated for the convenience of the description. In FIG. 5, the region A is a region surrounded by the points a→b→c→d. The region B is a region excluding the region A from the region surrounded by the points d→e→f→g. The regions A and B each do not need to be one, and the number of each of the regions A and B is arbitrary.

In the step S1, the controlling section 221 selects which force sensing result should be used for the force control among force sensing results of the sensors, based on the information on the operation position of the robot arm 101. The step will be more specifically described. The controlling section 221 discriminates which region the operation position of the robot arm 101 belongs to between a plurality of regions A and B, and selects which force sensing result of the sensor should be used, based on the discrimination result. Specifically, the controlling section 221 selects the sensing result of the first sensor 131, when the operation position of the robot arm 101 (end portion 131) belongs to the region A, and selects the sensing result of the second sensor 132, when the operation position of the robot arm 101 belongs to the region B.

On this occasion, the controlling section 221 uses the above described operation instruction as information on the operation position of the robot arm 101. Incidentally, the controlling section 221 may use the detection result of the operation position of the robot arm 101, which has been output from the encoder 161 or the encoder 162, as the information on the operation position of the robot arm 101. Thus, the controlling section 221 can grasp the information on the operation position of the robot arm 101.

In the example of FIG. 5, a part W1 which is a flexible part to be assembled is placed in the region A. When the robot arm 101 (end portion 131) is positioned in the region A because the force control of the fine external force is required, the controlling section 221 selects the first sensor 131 in the end portion of the robot arm 101, which is the sensor having the low rating and the high resolution.

In addition, in the example of FIG. 5, a part W2 which is a rigid-body part to be assembled is placed in the region B. When the robot arm 101 (end portion 131) is positioned in the region B because the force control of the external force of a high load is required, the controlling section 221 selects the second sensor 132 in each of the joints J1 to J3 of the robot arm 101, which is the sensor having the high rating.

Incidentally, in FIG. 5, the region B is set also above the trestle 110 (region A) in the Z-axis. In the region B of the upper side in the Y-axis, a high-speed operation at the time when the robot 100 conveys the parts is assumed, and the assembly operation based on the force control does not occur. However, for instance, when a human and the robot 100 cooperatively work, there is a case where unexpected collision occurs between the human and the robot 100. In such a case, it is desirable that the second sensor 132 senses a collision load and the robot 100 (robot arm 101) can appropriately retract. When something has collided with the robot arm 101, a high load is assumed to be generated, and accordingly the second sensor 132 is selected in the region B of the upper side in the Y-axis.

As described above, the robot apparatus according to the first embodiment performs the force control of the robot arm 101 by selectively using the force sensing result of the first sensor 131 and the second sensor 132, accordingly can sense the external force with high precision in a wide range from a fine external force to a large external force, and can control the force of the robot arm 101 with high precision. Specifically, the robot apparatus selectively uses the sensing result of the second sensor 132 of which the detectable range for the external force is large, in an assembly operation on which a high load is exerted, and selectively uses the sensing result of the first sensor 131 of which the detectable range for the external force is small, in an assembly operation in which it is needed to sense the fine external force. Thereby, the robot apparatus senses a force from a fine external force to an external force of a high load, and can control the force with high precision.

[Second Embodiment]

Figure 6:
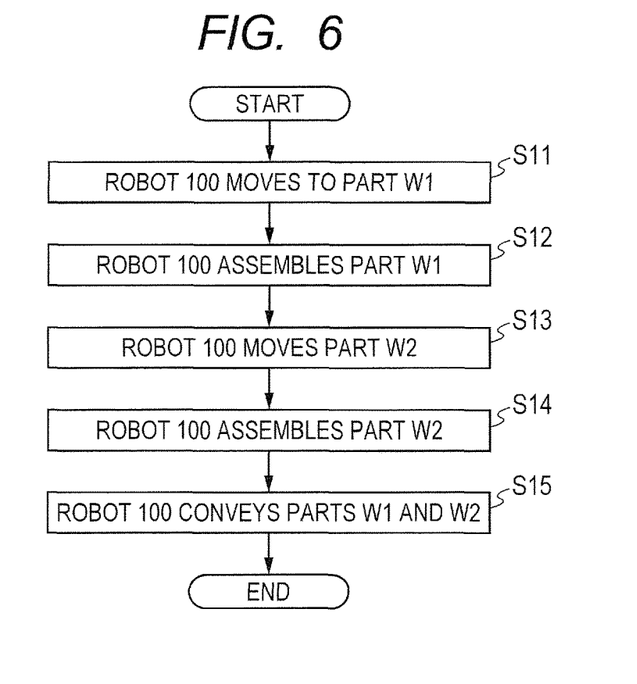
FIG. 6 is a flow chart which illustrates a method for controlling a robot according to a second embodiment of the present invention.

Next, a method for controlling a robot in a robot apparatus according to a second embodiment of the present invention will be described. FIG. 6 is a flow chart which illustrates the method for controlling the robot according to the second embodiment of the present invention. This flow chart in FIG. 6 illustrates the process in which the robot 100 assembles the part W1 which is a flexible part to be assembled and the part W2 which is a rigid-body part to be assembled. Incidentally, the configuration of the robot apparatus is the same as that of the robot apparatus 500 in the first embodiment, and accordingly the description will be omitted.

Firstly, the controlling section 221 controls an operation of the robot arm 101 so that the robot 100 moves to the part W1 (S11). Next, the controlling section 221 controls the operation of the robot arm 101 so that the robot 100 assembles the part W1 (S12). The controlling section 221 controls the operation of the robot arm 101 so that the robot 100 moves to the part W2 (S13). Next, the controlling section 221 controls the operation of the robot arm 101 so that the robot 100 assembles the part W2 (S14). Finally, the controlling section 221 controls the operation of the robot arm 101 so that the robot 100 conveys parts W1 and W2 (S15).

In the above steps S11 to S15, the controlling section 221 sends an operation instruction of the robot arm 101 to the drive controlling apparatus 233, and makes the robot arm 101 operate. Because of this, it is possible for the controlling section 221 to determine the operation position of the robot arm 101, similarly to that in the first embodiment.

Therefore, in the force control in the operations of the above described steps S11 to S15, the controlling section 221 selects a sensor based on the information on the operation position of the robot arm 101 (for instance, position of robot arm 101 based on operation instruction or detection result of position detecting portion). For instance, the controlling section 221 selects the sensing result of the first sensor 131 in the force control of the step S12, and selects the sensing result of the second sensor 132 in the force control of the steps S11, S13, S14 and S15.

For information, there is also a method of designating the instruction of the operation of the robot arm 101 by the teaching point. Therefore, though the sensor has been selected based on an operation pattern (operation instruction) of the robot arm 101, in the second embodiment, the sensor may be selected on every teaching point. In other words, the controlling section 221 may use a given teaching point as information on the operation position of the robot arm 101.

As described above, the robot apparatus also in the second embodiment performs the force control of the robot arm 101 by selectively using the force sensing result of the first sensor 131 and the second sensor 132, accordingly can sense the external force with high precision in a wide range from a fine external force to a large external force, and can control the force of the robot arm 101 with high precision.

[Third Embodiment]

Figure 7:
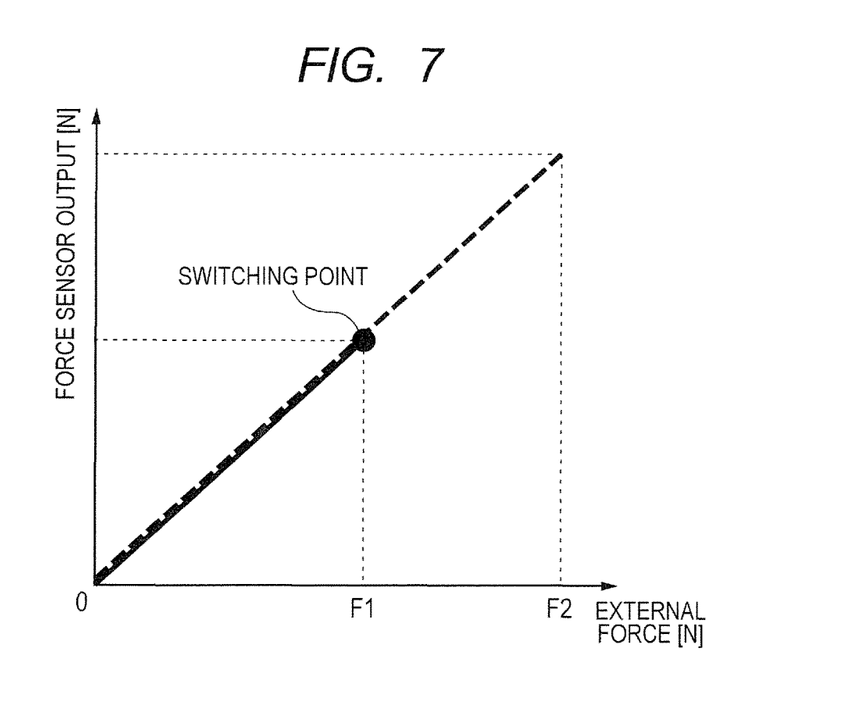
FIG. 7 is a view for describing a method for controlling a robot according to a third embodiment of the present invention.

Next, a method for controlling a robot in a robot apparatus according to a third embodiment of the present invention will be described. FIG. 7 is a view for describing the method for controlling the robot according to the third embodiment of the present invention. Incidentally, the configuration of the robot apparatus is the same as that of the robot apparatus 500 in the first embodiment, and accordingly the description will be omitted.

In the both of the above described first and second embodiments, the switch point has been set in the controlling section 221 before the robot 100 operates, specifically, it has been previously set which sensing result is to be used among the sensing results of sensors. In contrast to this, in the third embodiment, the sensing result of the sensor is selected in real time. The third embodiment will be specifically described below. FIG. 7 illustrates a graph that indicates outputs of the first sensor 131 and the second sensor 132, which have been obtained with respect to an external force.

The controlling section 221 selects which force sensing result of the sensor should be used for the force control, based on the magnitude of the force sensed by at least one sensor of the first sensor 131 and the second sensor 132.

Here, in FIG. 7, an output shown by a solid line is a detectable range of the external force for which a low-rating and high-resolution first sensor 131 functions effectively. In addition, an output shown by a dotted line is a detectable range of an external force for which a high-rating second sensor 132 functions effectively. Specifically, in FIG. 7, the detectable range of the first sensor 131 is 0 [N] or more and F1 [N] or less, and the detectable range of the second sensor 132 is 0 [N] or more and F2 (>F1) [N] or less. In other words, the rating of the first sensor 131 is F1 [N], and the rating of the second sensor 132 is F2 [N].

The controlling section 221 selects the force sensing result of the second sensor 132 when the external force is in a range of more than F1 [N] and F2 [N] or less. In addition, in the case where such an external force has acted as to stride the detectable ranges for the external force, in which the respective sensors 131 and 132 function effectively, the controlling section 221 selects either of the force sensing results of the sensors. In the third embodiment, the detectable ranges of the two sensors 131 and 132 overlap in the range of 0 [N] or more and F1 [N] or less, and when the external force is in this range, the controlling section 221 selects the force sensing result of the first sensor 131. Therefore, in the case of the range of 0 [N] or more and F1 [N] or less, the controlling section 221 selects the force sensing result of the first sensor 131, and in the case of the range of more than F1 [N] and F2 [N] or less, the controlling section 221 selects the force sensing result of the second sensor 132. In the third embodiment, F1 [N] results in being the switch point. For information, the switch point can be arbitrarily set according to types of a working object and a sensor, and the like.

Here, the controlling section 221 is in a state of being capable of monitoring the output results of the first sensor 131 and the second sensor 132 in real time, through a force sensor switching unit 222. Therefore, when a load has been measured, the force sensor switching unit 222 is operated by a switching signal sent from the controlling section 221, and thereby the controlling section 221 is enabled to select the sensor in real time.

Parts to be assembled have tolerances and do not have uniform shapes, and accordingly the external force which is exerted on the parts in an assembly is different even for the same parts. The method for controlling the robot according to the third embodiment selects the sensor in real time according to an actually sensed force, and accordingly shows a further enhanced controllability of the robot arm 101 at the time of the assembly than that in the case where the sensor has been previously selected.

[Fourth Embodiment]

Figure 8:
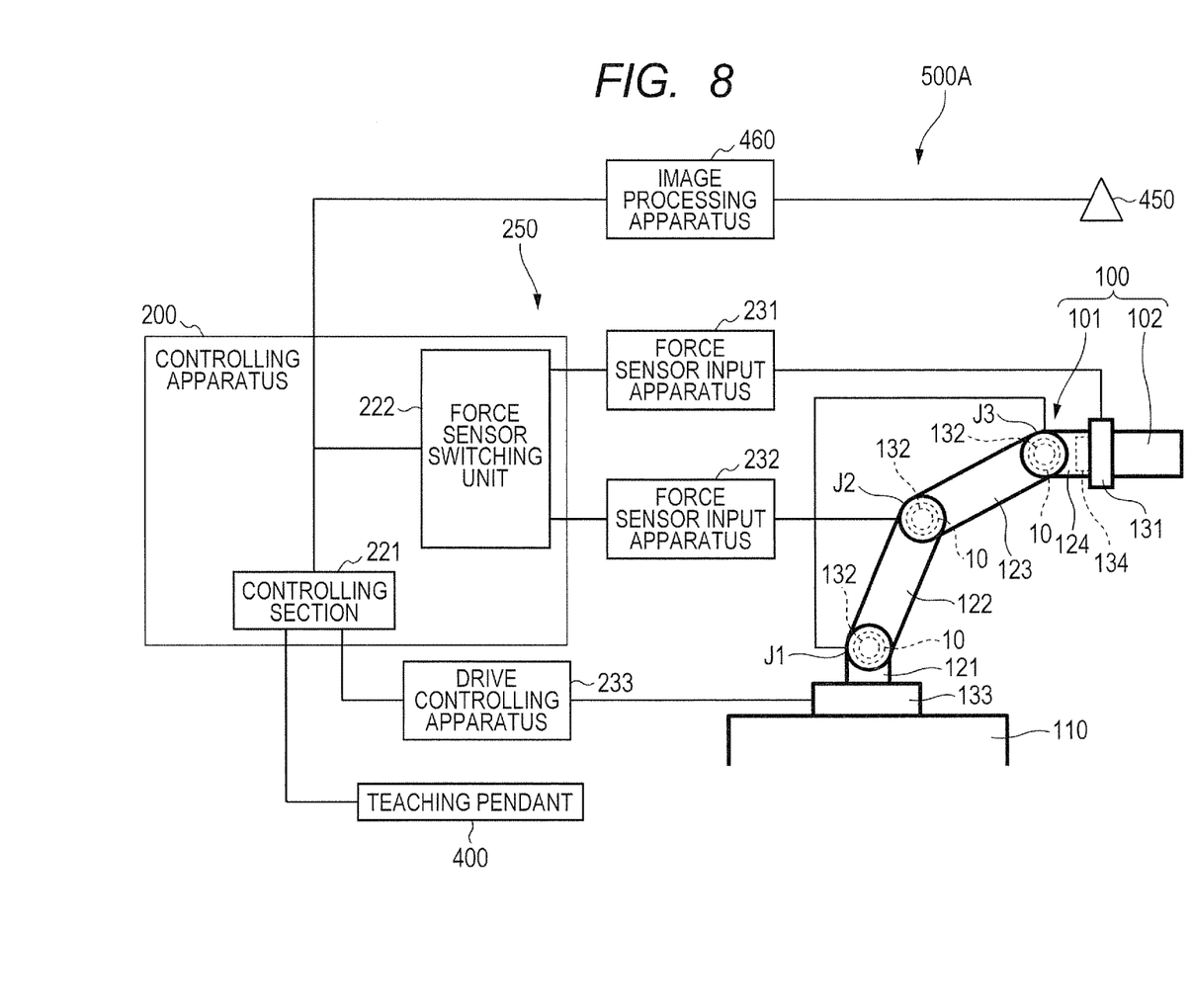
FIG. 8 is an explanatory view illustrating a robot apparatus according to a fourth embodiment of the present invention.

Next, a method for controlling a robot in a robot apparatus according to a fourth embodiment of the present invention will be described. FIG. 8 is an explanatory view illustrating the robot apparatus according to the fourth embodiment of the present invention. Incidentally, in a robot apparatus 500A of the fourth embodiment, configurations similar to those in the robot apparatuses of the above described first to third embodiments are designated by the same reference numerals, and the description will be omitted.

The robot apparatus 500A of the fourth embodiment is an apparatus in which a camera system is added to the robot apparatus 500 of the above described embodiments. Specifically, the robot apparatus 500A includes: a camera 450 which is an imaging apparatus; and an image processing apparatus 460 which processes a captured image that has been imaged by the camera 450, in addition to each configuration of the robot apparatus 500 of the above described embodiments.

The camera 450 is arranged in a position at which the camera can image parts W1 and W2 that are working objects arranged in a position (on trestle 110) on which the robot hand 102 attached to the robot arm 101 can work. The camera 450 is a digital camera, and is connected to the image processing apparatus 460 by a cable or radio transmission so that the data on the captured image can be transmitted to the image processing apparatus 460.

The image processing apparatus 460 is connected to the controlling apparatus 200, analyzes the captured image by the camera 450, and specifies which type between the parts W1 and W2 are the parts in the captured image. Then, the image processing apparatus 460 measures the position of the parts (parts W1 and W2) of which the types have been specified from the captured image, and transmits the result to the controlling apparatus 200.

The controlling section 221 of the controlling apparatus 200 sets regions A and B according to the positions of the parts W1 and W2, based on the analysis result of the captured image which has been imaged by the camera 450. More specifically, the regions A and B are previously set in a similar way to that of the above described first embodiment, in the controlling section 221. Then, the controlling section 221 changes the setting of the regions A and B so that the part W1 is located in the region A and the part W2 is located in the region B, based on the analysis result of the captured image.

Figure 9A:
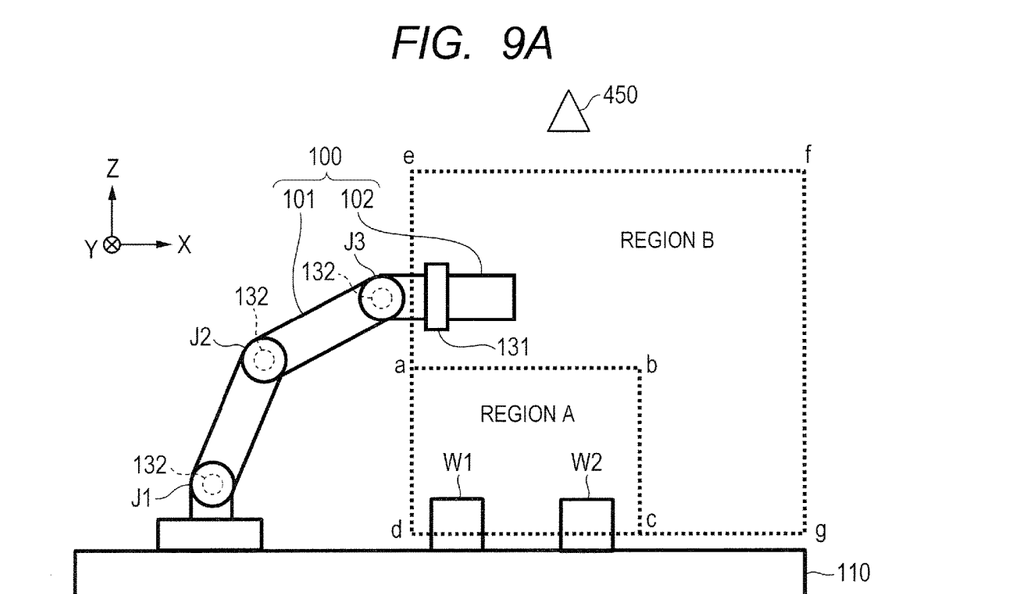
FIG. 9A is a schematic view illustrating a state at the time before regions A and B are changed.
Figure 9B:
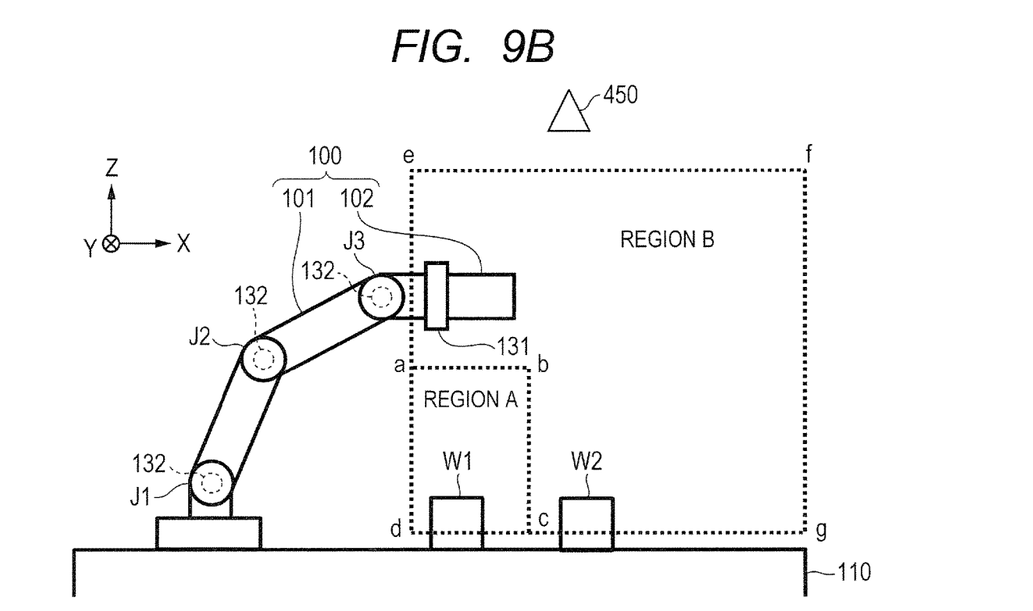
FIG. 9B is a schematic view illustrating a state at the time after the regions A and B have been changed.

The embodiment will be described referring to a specific example. FIG. 9A is a schematic view illustrating a state at the time before the regions A and B are changed, and FIG. 9B is a schematic view illustrating a state at the time after the regions A and B are changed.

As is illustrated in FIG. 9A, the data of the regions A and B which are switch regions of the sensor is previously set in the controlling section 221, similarly to that in FIG. 5. In FIG. 9A, the part W2 is positioned in the region A, and unless the part W2 is positioned in the region B, an effective force control cannot be realized. As is illustrated in FIG. 9A, there is a possibility that a human results in placing the part W2 on the region A when the human cooperatively works with the robot. Then, the controlling section 221 corrects the regions A and B as are illustrated in FIG. 9B, by using a measurement value based on the captured image of the camera 450.

Specifically, the controlling section 221 makes the camera 450 image the part W1 and the part W2 which are placed on the trestle 110, in the assembly operation by the robot 100. The image processing apparatus 460 processes the captured image which has been transmitted from the camera 450, and measures the positions of the parts W1 and W2. The image processing apparatus 460 sends the measurement result to the controlling section 221 of the controlling apparatus 200, and the controlling section 221 checks the positional relationship between the regions A and B which have been previously set and the parts W1 and W2. Then, the controlling section 221 newly sets the region A and the region B according to the check result, as illustrated in FIG. 9B.

The controlling section 221 can select a sensor in real time by sending a switching signal to the force sensor switching unit 222, based on the information on the new regions A and B.

For information, in the fourth embodiment, the controlling section 221 is configured to select the sensing results of the first sensor 131 and the second sensor 132 in the regions A and B, respectively, but the present invention is not limited to the method. Specifically, the controlling section 221 may select which force sensing result of the sensor should be used for the control force, according to the type of the part (parts W1 and W2) based on the analysis result of the captured image which has been imaged by the camera 450. The controlling section 221 may determine which type between the part W1 and the part W2 the part included in the captured image is, according to a shape or a color of the part included in the captured image.

In addition, a plurality of switching conditions (selection condition) may be combined which have been described in the first to the fourth embodiments. When a plurality of switching conditions are combined, the reliability of switching is further enhanced. The cases where the plurality of switching conditions are combined include, for instance, a case where the part to be assembled exists near a boundary line of the region A and the region B in FIG. 5, and a case where the external force is a value around the switching point in FIG. 7. In these cases, the controlling section 221 appoints compound conditions including a condition that the robot arm 101 (end portion 131) is positioned in the region A, and a condition that the external force is a predetermined value or less, and thereby can enhance the reliability of switching.

In addition, in the above described first to fourth embodiments, the case has been described where the multi-joint robot 100 is a vertical multi-joint robot, but the multi-joint robot 100 may be a horizontal multi-joint robot (SCARA robot), a parallel link robot or the like.

Furthermore, in the above described first to fourth embodiments, the case has been described where sensors (and force sensor input apparatuses) are two, but the sensors (and force sensor input apparatuses) may be three or more. In this case, any one of the sensors (and force sensor input apparatuses) may be selected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-015604 filed Jan. 29, 2015, and Japanese Patent Application No. 2015-249285 filed Dec. 22, 2015, which are hereby incorporated by reference herein in their entirety.

What is claimed is:

1. A robot apparatus comprising:
a robot arm having at least one joint;
an end-effector which is supported by an end portion of the robot arm;
a first sensor which is arranged between the end-effector and the end portion of the robot arm and detects force generated at the end-effector;
a second sensor which is arranged in the joint of the robot arm and detects torque generated at the joint; and
a controlling unit for controlling operations of the robot arm and the end-effector,
wherein:
ranges of detectable values of the first and second sensors are different from each other, and
the controlling unit selects one detection result of the detection results of the first sensor or the second sensor based on a predetermined condition, and controls the robot arm based on the detection result selected.

2. The robot apparatus according to claim 1, wherein the first sensor has a smaller detectable range and a higher resolution than that of the second sensor.

3. The robot apparatus according to claim 2, wherein the second sensor is provided with a protecting mechanism against an overload.

4. The robot apparatus according to claim 1, wherein the controlling unit selects one detection result of the detection results of the first sensor or the second sensor based on information on an operation position of the robot to use it for controlling the robot arm.

5. The robot apparatus according to claim 4, wherein the controlling unit selects one detection result of the detection results of the first sensor or the second sensor based on a work characteristics grasped by the robot apparatus to use it for controlling the robot arm.

6. The robot apparatus according to claim 4, wherein the controlling unit uses a given teaching point as the information on the operation position.

7. The robot apparatus according to claim 4, further comprising a position detecting portion which detects the operation position of the robot arm,
wherein the controlling unit uses the detection result by the position detecting portion as the information on the operation position.

8. The robot apparatus according to claim 4, wherein the controlling unit discriminates which region the operation position of the robot arm belongs to among a plurality of regions, and uses a discrimination result as the information on the operation position.

9. The robot apparatus according to claim 1, further comprising an imaging apparatus,
wherein the imaging apparatus images a working object that is arranged at a position at which the working object can be worked by the end-effector, and
the controlling unit selects one detection result of the detection results of the first sensor or the second sensor based on an analysis result of a captured image which has been imaged by the imaging apparatus to use it for controlling the robot arm.

10. The robot apparatus according to claim 1, wherein the controlling unit selects one detection result of the detection results of the first sensor or the second sensor, based on a magnitude of a force which has been sensed by at least one sensor among the first and second sensors to use it for controlling the robot arm.

11. A method for controlling a robot apparatus in which an end-effector is attached to an end portion of a robot arm having at least one joint, the robot apparatus having a first sensor which is arranged between the end-effector and the end portion of the robot arm and detects force generated at the end-effector, a second sensor which is arranged in the joint of the robot arm and detects torque generated at the joint and a controlling unit for controlling operations of the robot arm and the end-effector, wherein ranges of detectable values of the first and second sensors are different from each other, the method comprising:
selecting one detection result of the detection results of the first sensor or the second sensor based on a predetermined condition; and
controlling the robot arm based on the detection result selected.

12. The method for controlling the robot apparatus according to claim 11, wherein, the controlling selects one detection result of the detection results of the first sensor or the second sensor, based on information on an operation position of the robot to use it for controlling the robot arm.

13. The method for controlling the robot apparatus according to claim 12, wherein, the controlling discriminates which region the operation position of the robot belongs to among a plurality of regions, and uses a discrimination result as the information on the operation position.

14. The method for controlling the robot apparatus according to claim 11, wherein the robot apparatus further comprises an imaging apparatus, and the method further comprises:
   in the selecting, the controlling unit uses the imaging apparatus to capture a work object arranged on a workable position by the end-effector; and
   based on an analysis result of the captured image which has been imaged by the imaging apparatus, the detection result is selected from the detection results of the first sensor or the second sensor.

15. The method for controlling the robot apparatus according to claim 11, wherein, in the selecting, the controlling unit selects one detection result of the detection results of the first sensor or the second sensor based on a work characteristics grasped by the robot apparatus to use it for controlling the robot arm.

16. The method for controlling the robot apparatus according to claim 11, wherein, in the selecting, the controlling unit selects one detection result of the detection results of the first sensor or the second sensor, based on a magnitude of a force which has been sensed by the one of the first sensor and the second sensor to use it for controlling the robot arm.

17. A manufacturing method of an article using a robot apparatus, wherein the robot apparatus has an end-effector attached to an end portion of a robot arm having at least one joint, the robot having a first sensor which is arranged between the end-effector and the end portion of the robot arm and detects force generated at the end-effector, a second sensor which is arranged in the joint of the robot arm and detects torque generated at the joint, and a controlling unit for controlling operations of the robot arm and the end-effector, wherein ranges of detectable values of the first and second sensors are different from each other, the method comprising:
   selecting one detection result of detection results of the first sensor or the second sensor based on a predetermined condition; and
   controlling the robot arm based on the detection result selected.

18. The manufacturing method according to claim 17, wherein,
   in the selecting, the controlling unit selects one detection result of the detection results of the first sensor or the second sensor based on information on an operation position of the robot.

19. The manufacturing method according to claim 18, wherein, in the selecting, the controlling unit discriminates which region the operation position of the robot arm belongs to among a plurality of regions, and uses determination result as the information on the operation position.

20. The manufacturing method according to claim 17, wherein, the robot apparatus further comprises an imaging apparatus, and the method further comprises:
   in the selecting step,
   the imaging apparatus images a working object that is arranged at a position at which the working object can be worked by the end-effector, and
   the detection result is selected from the detection results of the first sensor or the second sensor based on an analysis result of a captured image which has been imaged by the imaging apparatus to use it for controlling the robot arm.

21. The manufacturing method according to claim 17, wherein, in the selecting step, the controlling unit selects one detection result of the detection results of the first sensor or the second sensor, based on a magnitude of a force which has been sensed by at least one sensor among the first and second sensors to use it for controlling the robot arm.

22. The manufacturing method according to claim 17, wherein, in the selecting step, the controlling unit selects one detection result of the detection results of the first sensor or the second sensor based on a work characteristics grasped by the robot apparatus to use it for controlling the robot arm.

* * * * *